United States Patent Office 2,927,032
Patented Mar. 1, 1960

2,927,032

DRY, FRIABLE MOLDING BATCH WITH THERMOSETTING PROPERTIES FOR FOUNDRY WORK

Manfred Lottermoser, Hamburg, Germany, assignor to Croning & Co., Hamburg-Altona, Germany, a firm No Drawing. Application July 23, 1957
Serial No. 673,573

Claims priority, application Germany August 30, 1956

12 Claims. (Cl. 106—38.7)

If molds or cores for foundry work are made according to the process known in America and England as the "shell molding process," granular molding batches are required which are dry, flow easily and do not first become clammy on being heated and then harden under intensive heating.

Molding batches with such properties are obtained by mixing or coating inert granular materials, mostly quartz sand, with thermo-setting binding agents.

Hitherto thermo-setting synthetic resins, such as are obtained by the condensation of phenols with aldehydes and also thermo-setting mixtures of certain types of pitch with sulphur were used as thermo-setting binding agents.

Binding agents which are based on polyisocyanates, polyamines and salts of high-molecular multibasic acids have likewise been proposed. None of these have, however, hitherto been introduced in practice. The reasons for this are too high price, unfavorable setting requirements, insufficient strength and metallurgical disadvantages of the molds.

The molding batches produced with the first-mentioned thermo-setting synthetic resins yield tough, firm molds which are perfect in every respect, but the high price of the thermo-setting synthetic resins is a disadvantage.

The molding batches produced with the second-mentioned pitch-sulphur mixtures are cheap and yield metallurgically perfect molds, but the strength of these molds is not quite as great as that of the molds made from thermo-setting synthetic resins.

The molding batch according to the invention combines great strength and good metallurgical properties of the molds with low price.

It is known that drying oils, especially linseed oil, can be converted into a solid state by chemically bonding oxygen, that is by oxidation. It is also known that these drying oils can likewise bond sulphur in setting. If it is now investigated how these two types of reaction can be superimposed, it will be found that the drying oils, after maximum oxidation, can still bond sulphur and that the solid oxidation products are thermoplastic, whereas they are converted into infusible substances by the additional bonding of sulphur. These results of reaction characteristic for drying oils have not hitherto been put to any use for foundry work and the molding batch claimed is based thereon.

In the simplest case they consist of mixtures of inert granular materials, such as dry quartz sand, with pulverulent sulphur and powdered oxidation products of drying oils. A solid oxidation product of linseed oil, for example, is obtained as is known by blowing air through the hot oil and a reoxidation after setting with nitric acid.

A shortening of the setting periods, increase in the strength, improvement of the grinding properties, friability, the desired metallurgical properties and a lowering in price are obtained if bitumina or bituminous substances are added to the drying oils before or after the oxidation by melting down. The quantities which can be added are limited. If these limits, which depend upon the kind of drying oil and the kind of the admixtures actually used, are exceeded, the properties mentioned are detrimentally affected. The maximum admixture quantities for bitumina and bituminous substances must be determined for the actual raw materials by experiment.

More convenient processes for the oxidation of the drying oils than that of blowing in air while heating, can be employed if the drying oils are present in finely divided form with large free surface area. This is most easily attained by mixing the granular materials with the drying oils so that the individual grains are coated with thin layers of drying oils and the large free surface area is produced by the granular structure of such a mixture. If siccative, for example about 1% cobalt resinate, has previously been dissolved in known manner in the drying oil, the oil films on the grains are oxidized by exposure to air, the mixture coagulates and, after it has been ground and mixed with the addition of pulverulent sulphur until the grains have been separated, it is ready for use. The sulphur can also be introduced before the oxidation of the drying oils or before they are mixed with the granular material; it will then be fixed on the grains and the finished molding batch is entirely free from dust. This is extremely desirable with a view to clean working and the avoidance of dust deflagration which may occur on coming into contact with overheated models when fine sulphur dust is present in the molding batch.

In the procedure just described for the production of the molding batch claimed it is possible to effect a saving in the relatively expensive siccative if this is not dissolved in the drying oil but in a cheap highly volatile solvent, for example in tetralin or in a mixture of tetralin and decalin, and this solution, after the granular materials have been coated with the drying oils, is mixed with the whole. If this procedure is followed, only the surfaces of the grains coated with the drying oils need be wetted with the siccative solution, so that the initiation of the oxidation from the outer side of the oil films on the grains is ensured.

If air is used in conjunction with siccatives as oxidation agent for the drying oils applied on the grains, it is necessary to spread out the mixed material in the air. However, if it is also desired to reduce the space requirement which this would entail, it is also possible to work into the mixtures composed of granular materials and the drying oils, liquid oxidation media which do not act solely as oxygen carriers, as in the case of the siccatives, but also give off oxygen. Aqueous solutions of potassium permanganate have been found particularly advantageous in this connection if added to the wetting agent. The potassium permanganate can likewise be partly or entirely replaced by other compounds giving off oxygen, such as bichromate per compounds and the like. Considerable time is saved if the potassium permanganate is dissolved in acetone.

*Examples*

(1) 84 kgs. of dry quartz sand (30% of which is finer than 0.1 mm., the whole finer than 0.3 mm.; slurry content less than 1%) are mixed with 3.35 kgs. sulphur powder (the whole finer than 0.06 mm.) and to this mixture a hot mixture of 1.92 kgs. siccative-free linseed oil with 2.88 kgs. hard bituminous lignite pitch (Krämer-Sarnow emollient point 90 to 100° C.) is added in an edge mill until complete homogeneity is reached. A solution of 100 g. potassium permanganate in a quantity of acetone necessary for the dissolution or in 1.8 l. of water is then allowed to flow in a thin jet while the mixing machine is running. If aqueous potassium permanganate is used, 10 g. of Pril (wetting agent of the Böhme-Fette-Chemie) is added to the 1.8 l. of water solution. After one or two days, the mixture is completely hardened out, owing to the oxidation of the linseed oil and is then ground in an edge mill until the grains are disintegrated. The molding batch, when it is applied to hot models at a temperature of 280 to 300° C., hardens in 45 to 120 seconds, according to the thickness of the layer, and the molding material obtained, in as far as the molding batch is strewn merely utilizing the force of gravity, possesses a bending strength of 35 to 45 kg./cm.$^2$.

(2) The potassium permanganate used in the first example can be replaced by 0.8 l. of an ordinary commercial cobalt resinate.

(3) A mixture of 3 parts by weight of linseed oil, 2 parts by weight of wood oil and 5 parts by weight at room temperature of spring-hard stearin pitch is heated until the first slight bubbling effect becomes apparent and maintained at this temperature for 3 to 5 hours. During this time a continuous current of preheated air is allowed to rush through the mixture and the cooled mass is then introduced into nitric acid which consists of one volumetric part of fuming nitric acid and 2.5 to 3 parts by volume of water and the mass is allowed to boil so long therein until a sample taken shows a spring-hard consistency at room temperature. The mass is then boiled in an aqueous chalk suspension until the nitric acid is neutralized. The air dried mass is then ground with 40 to 60% of its own weight of sulphur. The ground material must have a grain size finer than 0.06 mm. and is mixed with 10 to 20 times the quantity of dry quartz sand.

I claim:

1. As a new composition of matter, a molding batch for foundry work consisting of a dry nontacky mixture of 100 parts by weight of a granular refractory material with 2 to 25 parts by weight of powdered coagulated oxidized products of an oil having at least semi-drying properties and powdered elemental sulphur in an amount of substantially 20% to 70% by weight of said coagulated products.

2. As a new composition of matter, a molding batch for foundry work consisting of a dry nontacky mixture of 100 parts by weight of a granular refractory material with 2 to 25 parts by weight of powdered coagulated oxidized products of an oil having at least semi-drying properties and powdered solid hydrocarbons selected from the class consisting of asphalts, tars and pitches, in an amount such that the sum of said coagulated products and said hydrocarbons is 2 to 25 parts by weight and of powdered elemental sulphur in an amount of substantially 20% to 70% by weight of the sum of said coagulated products and said hydrocarbons, the proportion of said hydrocarbons to said oil products being up to 20% by weight.

3. As a new composition of matter, a molding batch for foundry work consisting of a dry nontacky mixture of 100 parts by weight of a granular refractory material with 2 to 25 parts by weight of powdered coagulated oxidized products of an oil having at least semi-drying properties, solid hydrocarbons selected from the class consisting of asphalts, tars and pitches and of elemental sulphur in an amount of substantially 20% to 70% by weight of said coagulated products, the proportion of said hydrocarbons to said oil products being up to 20% by weight.

4. As a new composition of matter, a molding batch for foundry work consisting of a dry nontacky mixture of 100 parts by weight of a granular refractory material the grains of which are coated with 2 to 25 parts by weight of coagulated oxidized products of an oil having at least semi-drying properties and powdered elemental sulphur in an amount of substantially 20% to 70% by weight of said coagulated products.

5. As a new composition of matter, a molding batch for foundry work consisting of a dry nontacky mixture of 100 parts by weight of a granular refractory material the grains of which are coated with 2 to 25 parts by weight of a composition containing coagulated oxidized products of an oil having at least semi-drying properties, solid hydrocarbons selected from the class consisting of asphalts, tars and pitches, and powdered elemental sulphur in an amount of substantially 20% to 70% by weight of said composition, the proportion of said hydrocarbons to said oil products being up to 20% by weight.

6. The process of producing shell molds and shell cores for foundry work, which comprises the steps of oxidizing a drying oil to a solid, comminuting the solid oxidation product to form a powdered coagulated product, mixing it with powdered elemental sulphur in an amount of substantially 20% to 70% by weight of the total mixture, mixing said mixture with a granular refractory material in a proportion of 100 parts by weight of the granular refractory material to 2 to 25 parts by weight of said mixture, forming a shell from the final mixture, and curing the shell at a temperature above the softening point of said coagulated product by chemical reaction with said elemental sulphur.

7. The process of producing shell molds and shell cores for foundry work, which comprises the steps of mixing a drying oil with hydrocarbons selected from the class consisting of asphalts, tars, and pitches, the proportion of said hydrocarbons to said oil being up to 20% by weight, oxidizing the drying oil to a solid, comminuting the solid oxidation product to form a powdered coagulated product, mixing it with powdered elemental sulphur in an amount of substantially 20% to 70% by weight of the total mixture, mixing said mixture with a granular refractory material in a proportion of 100 parts by weight of the granular refractory material to 2 to 25 parts by weight of said mixture, forming a shell from the final mixture, and curing the shell at a temperature above the softening point of said coagulated product by chemical reaction with said elemental sulphur.

8. The process of producing shell molds and shell cores for foundry work, which comprises coating the granules of a granular refractory material with a drying oil, the proportions being 100 parts by weight of the granular material to 2 to 25 parts by weight of the drying oil, adding powdered elementary sulphur to the coated granules in an amount of substantially 20 to 70% of the drying oil, oxidizing the drying oil to a solid coagulated product, comminuting the compound to form a powdered product, forming a shell from said powdered product, and curing the shell at a temperature above the softening point of said coagulated product by chemical reaction with said elemental sulphur.

9. The process of producing shell molds and shell cores for foundry work, which comprises mixing quartz sand with sulphur powder, adding to this mixture a hot mixture of linseed oil with bituminous lignite pitch, the proportions being 20% to 70% by weight of sulphur powder to 100% of linseed oil, up to 20% of pitch to 100% linseed oil and 100 parts by weight of sand to 2 to 25 parts by weight of linseed oil, oxidizing the linseed oil to form a solid coagulated oxidation product, comminuting the compound to form a powdered product, forming a shell from said powdered product, and curing the shell at a temperature above the softening point of said coagulated product by chemical reaction with said elemental sulphur.

10. The process according to claim 9, comprising the step of adding a solution of potassium permanganate to said mixture of quartz sand with linseed oil and lignite pitch and sulphur.

11. The process according to claim 9, comprising the step of adding cobalt resinate to said mixture of quartz sand with linseed oil and lignite pitch and sulphur.

12. The process of producing shell molds and shell cores for foundry work, which comprises mixing linseed oil, wood oil and stearin pitch, the proportions being 3 parts by weight of linseed oil to 2 parts by weight of wood oil and 5 parts by weight of stearin pitch, oxidizing the oils to form a solid coagulated oxidation product, grinding the product with 40 to 60% of its weight of sulphur, mixing the ground product with 10 to 20 times the quantity of quartz sand, forming a shell from this mixture, and curing the shell at a temperature above the softening point of said coagulated product by chemical reaction with said elemental sulphur.

References Cited in the file of this patent

UNITED STATES PATENTS

| | | |
|---|---|---|
| 1,888,270 | Hipple | Nov. 22, 1932 |
| 1,987,530 | Hipple | Jan. 8, 1935 |
| 2,040,461 | Bonney | May 12, 1936 |
| 2,440,467 | Frilette | Apr. 27, 1948 |
| 2,556,335 | Moser | June 12, 1951 |
| 2,706,188 | Fitko et al. | Apr. 12, 1955 |

FOREIGN PATENTS

| | | |
|---|---|---|
| 261,523 | Great Britain | Nov. 25, 1926 |